US012798785B2

(12) United States Patent
Koennen et al.

(10) Patent No.: US 12,798,785 B2
(45) Date of Patent: Nov. 17, 2026

(54) AIRCRAFT AIR SPEED MANAGEMENT

(71) Applicant: The Boeing Company, Arlington, VA (US)

(72) Inventors: Joost Edwin Koennen, Meppel (NL); Veeresh Kumar Masaru Narasimhulu, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 198 days.

(21) Appl. No.: 18/435,641

(22) Filed: Feb. 7, 2024

(65) Prior Publication Data

US 2025/0250023 A1 Aug. 7, 2025

(51) Int. Cl.

*G05D 1/644* (2024.01)
*B64D 43/02* (2006.01)
*G05D 101/15* (2024.01)
*G05D 109/20* (2024.01)

(52) U.S. Cl.

CPC ............. *B64D 43/02* (2013.01); *G05D 1/644* (2024.01); *G05D 2101/15* (2024.01); *G05D 2109/20* (2024.01)

(58) Field of Classification Search

CPC .... B64D 43/02; G05D 1/644; G05D 2101/15; G05D 2105/22; G05D 2107/13; G05D 2109/20; G05D 2109/22
See application file for complete search history.

(56) References Cited

U.S. PATENT DOCUMENTS 8,738,200 B2 * 5/2014 Mere ........................ G08G 5/21 701/14
10,556,703 B1 * 2/2020 Skola ....................... G07C 5/08
2013/0080043 A1 * 3/2013 Ballin ...................... G08G 5/32 701/120
2016/0059872 A1 * 3/2016 Kumar ................ F02D 41/0025 701/19
2016/0236790 A1 * 8/2016 Knapp ................... G01C 21/20
2017/0323274 A1 * 11/2017 Johnson ............... G05B 13/041
2018/0155061 A1 * 6/2018 Bewlay ..................... F02C 3/04
2019/0033853 A1 * 1/2019 O'Laughlin ............. G08G 5/53
2025/0124796 A1 * 4/2025 Stock ..................... G08G 5/723

* cited by examiner

*Primary Examiner* — Matthew J. Reda
(74) *Attorney, Agent, or Firm* — Yee & Associates, P.C.

(57) ABSTRACT

A computer implemented method for managing a current speed of an aircraft. A number of processor units identify a delay in an arrival time for reaching a destination location for a current flight of the aircraft. The number of processor units determines a new speed for reducing the delay during the current flight of the aircraft based on a state of the aircraft that optimizes a number of performance metrics for the aircraft using an aircraft specific fuel consumption model for the aircraft.

20 Claims, 15 Drawing Sheets

AIRCRAFT AIR SPEED MANAGEMENT

BACKGROUND INFORMATION

1. Field

The present disclosure relates generally to aircraft and in particular, to managing the airspeed of aircraft to increase fuel efficiency for higher speed flights.

2. Background

Airlines operate commercial aircraft to fly passengers and cargo between airports. The process involves planning and coordinating flights between airports. However, in the execution of these flights, delays from planned arrival times can occur and are not uncommon.

One manner in which the delays can be reduced involves flying at faster speeds. Flying a commercial airplane at a faster speed to make up for a delay in the flight of the commercial airplane is not an uncommon practice. Commercial airplanes typically operate within a normal operating speed envelope for fuel efficiency purposes.

Flying at a faster speed can reduce or eliminate the delay but reduce fuel efficiencies. As a result, this increase in speed can result in more on-time flights but can increase the operating costs for an airline. Further, operating at faster speeds can also result in increased maintenance for the aircraft.

SUMMARY

An embodiment of the present disclosure provides a flight operation management system comprising a computer system and a speed manager located in the computer system. The speed manager is configured to identify a delay in an arrival time for reaching a destination location for a current flight of an aircraft. The speed manager is configured to determine a cost index for reducing the delay during the current flight of the aircraft based on a state of the aircraft that reduces undesired fuel consumption using an aircraft specific fuel consumption model for the aircraft.

An embodiment of the present disclosure provides a flight operation management system comprising a computer system and a speed manager located in the computer system. The speed manager is configured to identify a delay in an arrival time for reaching a destination location for a current flight of an aircraft. The speed manager is configured to determine a new speed for reducing the delay during the current flight of the aircraft based on a state of the aircraft that optimizes a number of performance metrics for the aircraft using an aircraft specific fuel consumption model for the aircraft.

Yet another embodiment of the present disclosure provides a computer implemented method for managing a current speed of an aircraft. A number of processor units identify a delay in an arrival time for reaching a destination location for a current flight of the aircraft. The number of processor units determines a cost index for reducing the delay during the current flight of the aircraft based on a state of the aircraft that reduces undesired fuel consumption using an aircraft specific fuel consumption model for the aircraft.

Still another embodiment of the present disclosure provides a computer implemented method for managing a current speed of an aircraft. A number of processor units identify a delay in an arrival time for reaching a destination location for a current flight of the aircraft. The number of processor units determines a new speed for reducing the delay during the current flight of the aircraft based on a state of the aircraft that optimizes a number of performance metrics for the aircraft using an aircraft specific fuel consumption model for the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
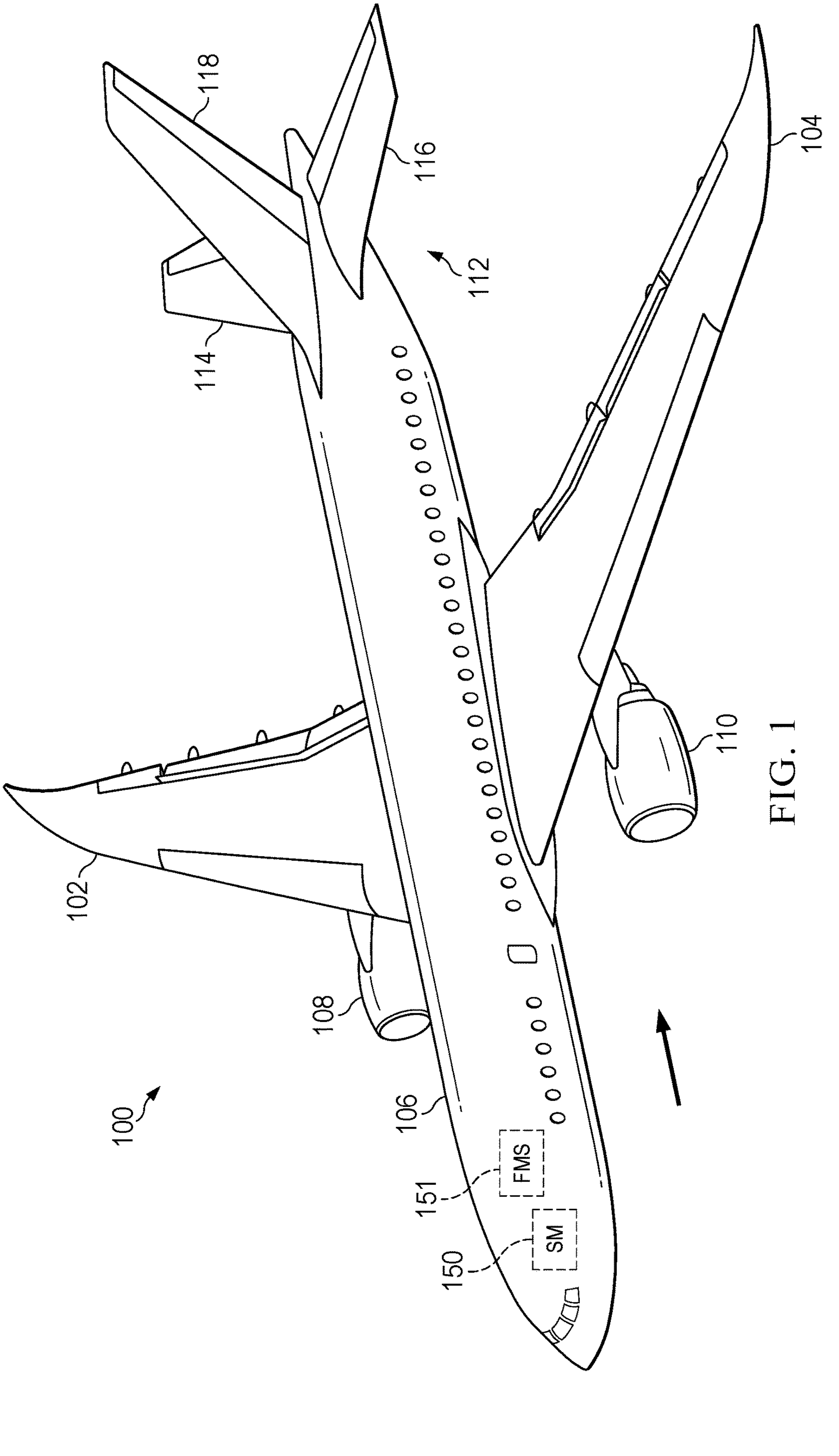
FIG. 1 is an illustration of an aircraft in accordance with an illustrative embodiment.

The illustrative embodiments recognize and take into account one or more different considerations as described herein. For example, increasing the speed of an aircraft to make up for delay can be based on a cost versus reducing the delay. For example, a cost index model can be used to determine how much to increase the speed of an aircraft. The cost index can be represented as time cost divided by fuel cost.

In these examples, time costs are items that can change based on the amount of time that an aircraft flies. For example, time costs can include crew cost, maintenance, and other costs that are time dependent. The fuel cost includes increases for increased fuel consumption resulting from flying at a faster speed.

The cost index model can be a profile of a cost index versus speed. With this model, the speed of the aircraft increases as the cost index is increased. However, at some point, increases in speed become flat relative to the increase in the cost index. As a result, increasing the cost index does not increase the speed or reduce the delay through the faster speed with respect to the increased cost represented by the cost index.

The different cost indexes that can be used are often specified by an airline or other operator of the aircraft. As the cost index increases, the speed of the aircraft increases.

Currently, airlines can use cost index models in the form of cost index databases or tables. A cost index model can be present for each model of an aircraft.

This model is generic for a model or version of an aircraft. As a result, a different aircraft of the same model or version may have a different performance. With this situation, time gains in reducing delay for a certain speed based on the cost index may not be cost effective for one aircraft maybe more effective for another aircraft the same model because of different actual performance. As a result, selecting a cost index for an increase in speed can result in different fuel savings or a lack of fuel savings.

Thus, using cost indexes for operating aircraft to reduce delays can result in vastly different fuel consumption using currently available generic models for setting speeds using cost indexes. In other words, the cost index does not accurately reflect the costs for operating a specific aircraft of the same model and of the same version.

Thus, illustrative embodiments provide a method, apparatus, system, and computer program product for aircraft speed management. For example, a flight operation management system can comprise a computer system and a speed manager located in the computer system. The speed manager is configured to identify a delay in the arrival time for reaching a destination location for a current flight of an aircraft. The speed manager is configured to determine a cost index for reducing the delay during the current flight of the aircraft based on a state of the aircraft that reduces undesired fuel consumption using an aircraft specific fuel consumption model for the aircraft.

As a result, the cost index can be selected in the illustrative examples that provides an improved tradeoff between time gained and fuel consumption. For example, changing the cost index from 100 to 300 using a generic model may provide a minor time gain but larger fuel penalty. For example, the change in the cost index from 100 to 160 may be 0.4 Mach while the change in the cost index from 160 to 300 may be 0.1 Mach. The increase in the cost index from 160 to 300 results in a smaller change in Mach as compared to a change in the cost index from 100 to 160. As a result, a cost index of 160 can be determined to provide a desired reduction in delay while reducing undesired fuel consumption.

With reference now to the figures, and in particular, with reference to FIG. 1, an illustration of an aircraft is depicted in accordance with an illustrative embodiment. In this illustrative example, commercial airplane 100 has wing 102 and wing 104 attached to body 106. Commercial airplane 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Commercial airplane 100 is an example of an aircraft in which speed manager 150 can be implemented in commercial airplane 100 to control the speed of commercial airplane 100 in a manner that reduces time delay for a flight while managing fuel consumption that is specific to commercial airplane 100.

In this example, the flight of commercial airplane 100 is traveling from a departing airport to a destination airport. The flight plan for commercial airplane 100 has a flight time of 2 hours and 15 minutes with a scheduled arrival time of 5:00 PM. However, various factors may cause delays in the scheduled arrival time. For example, a delay in this scheduled arrival time can be caused by at least one of a delayed departure from the gate, unexpected maintenance, a delayed takeoff time, a change in the route for the flight of commercial airplane 100 caused by environmental conditions or traffic, or other types of delays.

With this example, a delay of 20 minutes may result in the predicted arrival time at the destination airport to be 5:20 PM. Reducing delay in the flight of commercial airplane 100 is desirable for a number of different reasons.

As a result, a delay of 20 minutes is present for this current flight of commercial airplane 100. In this illustrative example, a pilot can input this delay into speed manager (SM) 150. In response, speed manager 150 determines a best trade-off between increasing speed that compensates for the delay and reducing undesired fuel consumption specifically for commercial airplane 100.

In this illustrative example, airlines currently make the adjustments for delays using cost indexes. In other words, a cost index is identified and entered into flight management system 151 to change the speed of commercial airplane 100. The cost index reduces the delay in a manner that also takes into account fuel consumption.

Unlike current systems, the fuel consumption is determined specifically for commercial airplane 100. This fuel consumption that is specific to commercial airplane 100 is used to identify the appropriate cost index. This cost index is displayed to the pilot by speed manager 150.

In this example, the pilot enters this cost index into flight management system (FMS) 151 in commercial airplane 100. Flight management system 151 translates the cost index into a speed and adjusts the speed of commercial airplane 100 to the speed identified.

Thus, in this example, changes in speed are identified based on aircraft even when the aircraft are the same type and version. For example, if commercial airplane 100 is a Boeing 787-9, the cost index identified for commercial airplane 100 can be different from another commercial airplane that is a Boeing 787-9.

In this example, the identification of the appropriate cost index for commercial airplane 100 is based on historical data gathered for each commercial airplane that enables speed manager 150 to predict fuel consumption and potential changes in delays identified of commercial airplane 100. In other words, historical data identifying operating conditions and fuel consumption from previous flights is used to determine a profile for commercial airplane 100. Further, this determination can be formed dynamically during the flight of commercial airplane 100. In other words, speed manager 150 can take into account maximum range cruise (MRC) shifts as the flight progresses. Maximum range cruise shift is used in long-range flight planning to optimize the fuel efficiency in a manner that maximizes the range of aircraft. As a result, aircraft can fly at an airspeed referred to as a maximum range cruise (MRC). As the aircraft weight decreases from fuel consumption, this airspeed can change. The speed manager 150 can take this into account in determining the cost index for use in changing the speed of commercial airplane 100.

As a result, the cost index used to determine the speed can change during flight of commercial airplane 100 as operating and other conditions change for commercial airplane 100.

Further, this illustrative example provides a practical application of identifying the cost index for a speed change to control the speed of commercial airplane 100. In this illustrative example, the pilot inputs the delay into speed manager 150. In turn, speed manager 150 outputs a cost index that provides a best trade-off of increasing speed that compensates the delay and also produces undesired fuel consumption specifically for commercial airplane 100 as compared to using cost indexes that are generic for commercial airplanes.

As a result, the use of speed manager 150 provides shorter flight times that result in at least one of improved passenger experience, cost savings, increased aircraft utilization with faster turnaround times, environmental benefits from reduced greenhouse gases, or other types of improvements or benefits.

FIG. 1 is intended as an example, and not as an architectural limitation for the different illustrative embodiments. In this example, cost indexes are described because of the implementation by commercial airlines to use these cost indexes to adjust the speed of an aircraft. In other illustrative examples, a speed can be output rather than a cost index for use in adjusting the speed of commercial airplane 100.

Figure 2:
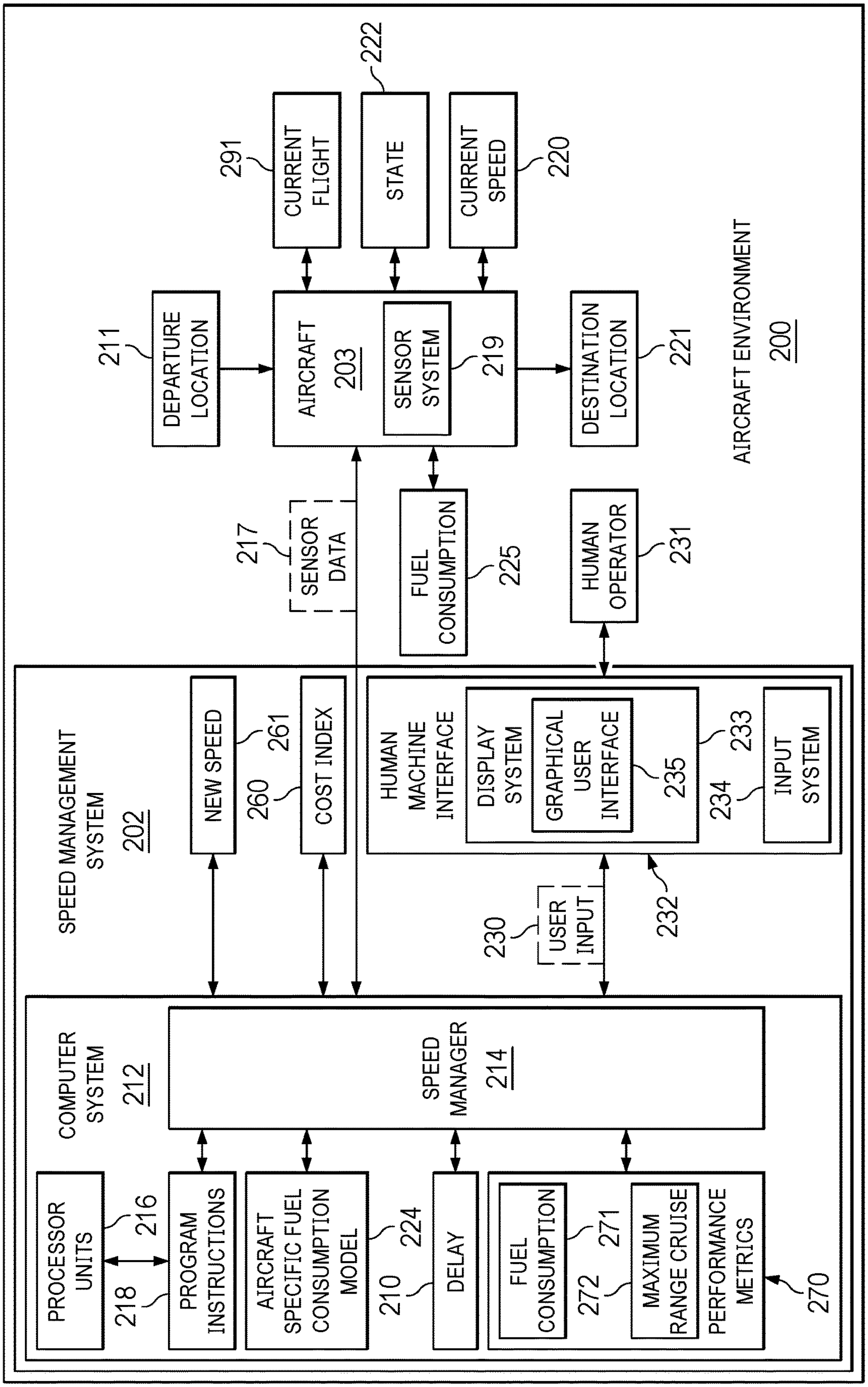
FIG. 2 is an illustration of a block diagram of an aircraft environment in accordance with an illustrative embodiment.

With reference now to FIG. 2, an illustration of a block diagram of an aircraft environment is depicted in accordance with an illustrative embodiment. In aircraft environment 200, current speed 220 of aircraft 203 can be managed by speed management system 202. Current speed 220 can be managed in a manner that reduces delay 210 in aircraft 203 traveling from departure location 211 to destination location 221.

In this illustrative example, the speed of aircraft 203 can be described in a number of ways. For example, the speed can be a Mach number, a ground speed, or some other manner in which the speed of aircraft 203 201 can be represented.

In the illustrative example, aircraft 203 can be selected from a group comprising a commercial airplane, a cargo airplane, a rotorcraft, a tilt-rotor aircraft, a tilt wing aircraft, a vertical takeoff and landing aircraft, an electrical vertical takeoff and landing vehicle, a personal air vehicle, and an unmanned aerial vehicle. Departure location 211 and destination location 221 can be selected from at least one of an airport, a vertiport, a heliport, an airstrip, an airbase, or other location that aircraft 203 can use to take off and land.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

In this illustrative example, speed management system 202 includes a number of different components. As depicted, speed management system 202 comprises computer system 212 and speed manager 214. Speed manager 214 is located in computer system 212.

Speed manager 214 can be implemented in software, hardware, firmware or a combination thereof. When software is used, the operations performed by speed manager 214 can be implemented in program instructions configured to run on hardware, such as a processor unit. When firmware is used, the operations performed by speed manager 214 can be implemented in program instructions and data can be stored in persistent memory to run on a processor unit. When hardware is employed, the hardware can include circuits that operate to perform the operations in speed manager 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 for implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, speed manager 214 identifies delay 210 in an arrival time for reaching destination location 221 for current flight 291 of aircraft 203. This identification can be performed using user input 230 received from human operator 231 using human machine interface 232. In this example, human machine interface 232 comprises display system 233 and input system 234.

Display system 233 is a physical hardware system and includes one or more display devices on which graphical user interface 235 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

Human operator 231 is a person that can interact with graphical user interface 235 through user input 230 generated by input system 234 for computer system 212. For example, human operator 231 can be a pilot, copilot, a crewmember, or other operator of aircraft 203.

Input system 234 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device.

In response to identifying delay 210, speed manager 214 determines new speed 261 for reducing delay 210 during current flight 291 of aircraft based on state 222 of aircraft 203 that optimizes a number of performance metrics 270 for aircraft 203 using an aircraft specific fuel consumption model 224 for aircraft 203. In this example, state 222 can be determined using sensor system 219 for aircraft 203. Sensor system 219 is a hardware system and includes sensors that generate sensor data 217 about aircraft 203. Sensor data 217 is sent to speed manager 214.

In this example, sensor data 217 describes state 222 of aircraft 203. In one illustrative example, state 222 can comprised of an altitude of aircraft 203, a gross weight of the aircraft 203, and an air temperature of an environment around the aircraft 203. In another illustrative example, state 222 of aircraft 203 is comprised of at least one of an altitude of aircraft 203, a gross weight of aircraft 203, an air temperature of an environment around the aircraft, air angle of attack, horizontal stabilizer position, pressure, or total fuel weight. The parameters used for state 222 can be any parameter that affects fuel consumption 271 by aircraft 203.

In this illustrative example, the number of performance metrics 270 can take a number of forms. For example, the number of performance metrics 270 can be selected from at least one of fuel consumption 271, maximum range cruise (MRC) 272, or some other suitable performance metric for aircraft 203.

In this illustrative example, optimizing a metric means that operation of aircraft 203 is such that the metric is as close as possible to a desired level for the metric. This desired level can be the best that can be obtained or some lower level that is selected for a desired level for the metric. For example, if a range of speeds is present for use in reducing delay 210, speeds can be selected to optimize fuel consumption 271 as a performance metric.

In this example, the particular speed selected for reducing delay 210 can be such that an undesired fuel consumption is reduced in selecting new speed 261 to reduce delay 210. A cost versus benefits analysis can be made as to how much fuel consumption 271 increases when increasing the speed of aircraft 203. At some point, increasing fuel consumption does not provide a desired level with respect to the reduction in delay 210.

This cost-benefit analysis can be performed using cost index 260. Cost index 260 is cost of time divided by cost of fuel. The cost of fuel can be determined using fuel consumption 271. As speed increases, fuel consumption 271 increases, resulting in an increase in the cost of fuel. Further, as speed increases, delay 210 decreases, resulting in a decrease of time-based costs such as crew cost and maintenance because of the decrease in time that aircraft 203 is flying.

In these illustrative examples, a maximum cost index can be set for cost index 260. This limit to cost index 260 can be set by airlines, safety considerations, and other suitable factors.

Aircraft specific fuel consumption model 224 is a model that predicts fuel consumption 271 specifically for aircraft 203 based on state 222 of aircraft 203. This model models the performance of aircraft 203 and is not specific for performance of other aircraft even though the other aircraft may be of the same model and version.

For example, if aircraft 203 is a Boeing 787-9, aircraft 203 has fuel consumption 271 that can be predicted by aircraft specific fuel consumption model 224 based on state 222 of aircraft 203. Aircraft 203 may have specific performance characteristics that affect fuel consumption based on engine operating hours, maintenance performed on engine parts, parts replaced, gross weight, and other factors that are unique to aircraft 203.

Maintenance and replacement parts for aircraft 203 other than those in the engines can also affect the fuel consumption. For example, maintenance or service of control surfaces such as flaps for ailerons can provide better aerodynamic performance, reducing fuel consumption.

These engine performance characteristics are unique to aircraft 203 and are different on other aircraft even though those aircraft may be of the same model or version or even if those other aircraft are from the same line that produced aircraft 203. As a result, aircraft specific fuel consumption model 224 does not provide predictions on fuel consumption 271 with the same accuracy if used with another aircraft. Thus, those examples can provide increased accuracy in determining new speed 261 needed to reduce delay 210 while taking into account reducing undesired fuel consumption.

In this example, new speed 261 determined for aircraft 203 can be displayed to human operator 231 in graphical user interface 235 on display system 233. Human operator 231 can then input new speed 261 into computer system 212 to change current speed 220 of aircraft 203 to new speed 261. In this manner, human operator 231, such a pilot can adjust current speed 220 of aircraft 203 based upon this input from speed manager 214 in computer system 212.

Computer system 212 can include at least one of flight management computer (FMC), a flight management system (FMS), an electronic flight bag, or other computing devices. These computing devices can be locations where speed manager 214 is located and also can be used to control current speed 220 of aircraft 203.

This determination of new speed 261 for aircraft 203 can be performed dynamically during current flight 291 of aircraft 203. For example, speed manager 214 can continue to determine delay 210 and new speed 261 as state 222 of aircraft 203 changes.

In one illustrative example, speed manager 214 can use cost index 260 to determine new speed 261. With the use of cost index 260, speed manager 214 identifies delay 210 in an arrival time for reaching destination location 221 for current flight 291 of aircraft 203. Speed manager 214 determines cost index 260 for reducing delay 210 during current flight 291 of aircraft 203 based on a state 222 of aircraft 203 that reduces undesired fuel consumption using aircraft specific fuel consumption model 224 for aircraft 203.

This example, speed manager 214 can display cost index 260 in graphical user interface 236 on display system 233. Human operator 231 can input cost index 260 using human machine interface 232 to cause speed manager 214 to adjust current speed 220 to new speed 261 represented by cost index 260.

In another illustrative example, speed manager 214 identifies new speed 261 for aircraft 203 using cost index 260. Speed manager 214 can then adjust current speed 220 of aircraft 203 to new speed 261. This adjustment can be made automatically by speed manager 214. This type of adjustment can be made when aircraft 203 is an unmanned aerial vehicle or an aircraft using an autopilot function.

In one illustrative example, one or more technical solutions are present that overcome a technical problem with reducing delay in a manner that does not result in undesired fuel consumption. Current commercial airplanes can use cost indexes to set faster speeds to reduce delays. These cost indexes, however, do not accurately reflect the fuel cost or time costs for specific aircraft.

As a result, one or more illustrative examples can provide an ability to reduce delays in arrival times for aircraft in a manner that also produces undesired fuel consumption of an aircraft. In the different illustrative examples, the determinations of speeds or cost indexes for settings speeds of aircraft are based on models that are specific to each individual aircraft. In other words, each individual aircraft can have a fuel consumption model that is specific to that aircraft. A selection of a new speed can reduce the delay and can be more accurate and increase the fuel efficiency of aircraft as compared to using current models which are generic to aircraft. Further, the different illustrative examples can also take into account other performance metrics such as maximum range cruise.

In the different illustrative examples, this model can be added as an additional component in addition to the current cost index models placed in aircraft. This model can be used to select the appropriate cost index to control the fight of aircraft such as a commercial airplane in which cost indexes are entered to control the speed of the aircraft when reducing delay.

Computer system 212 can be configured to perform at least one of the steps, operations, or actions described in the different illustrative examples using software, hardware, firmware or a combination thereof. In particular, speed manager 214 transforms computer system 212 into a special purpose computer system as compared to currently available general computer systems that do not have speed manager 214.

In the illustrative example, the use of speed manager 214 in computer system 212 integrates processes into a practical application for managing the speed of an aircraft. In this illustrative example, the use of speed manager 214 can identify the speed for aircraft that reduces delay while also reducing undesired fuel consumption as part of a practical application in which the identified speed can then be used to manage the speed of the aircraft during the current flight of the aircraft. In these illustrative examples, speed manager 214 performs calculations, determinations, steps, and other operations with a speed and accuracy that cannot be performed by a human operator during the flight of an aircraft.

Further, speed manager 214 in computer system 212 is directed to provide improvement to current systems that generate cost indexes because speed manager 214 takes into account the performance of aircraft 203. In these examples, the cost index provided by an airline or manufactured for a particular model of aircraft may not be accurate for the current state of aircraft 203. As a result, the selection of the cost index based on current databases and tables available in aircraft can result in inefficient change in airspeed that does not improve or reduce undesired fuel consumption without using speed manager 214.

The illustration of aircraft environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, speed management system 202 is shown as a separate block from aircraft 203. In these illustrative examples, speed management system 202 can be integrated in aircraft 203. In other illustrative examples, speed manager 214 can be implemented in a computing device carried onto aircraft 203. In yet another illustrative example, speed manager 214 can be in a remote location that is in communication with aircraft 203. This type of implementation may be used when aircraft 203 is an unmanned aerial vehicle that is remotely controlled by human operator 231.

Figure 3:
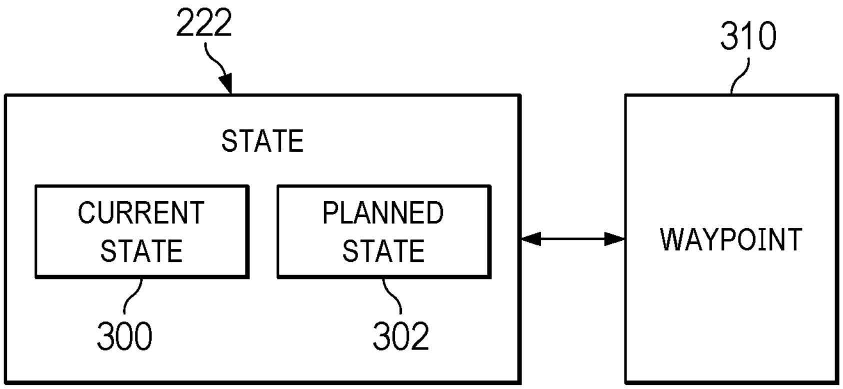
FIG. 3 is an illustration of a block diagram of a state for aircraft in accordance with an illustrative embodiment.

Next in FIG. 3, an illustration of a block diagram of determining a speed or cost index for the state for an aircraft at different waypoints during flight of an aircraft is depicted in accordance with an illustrative embodiment. In the illustrative examples, the same reference numeral may be used in more than one figure. This reuse of a reference numeral in different figures represents the same element in the different figures.

In this illustrative example, state 222 can be at least one of current state 300 or planned state 302 of aircraft 203. Current state 300 is the state of aircraft 203 as detected by sensor system 219 a point in time during current flight 291 of aircraft 203. This current state is identified when the calculation or determination of cost index 260 or new speed 261 is performed to reduce delay 210.

Planned state 302 is a future state of aircraft 203 that has not yet occurred along a future portion of current flight 291. In this example, planned state 302 is determined based on the flight plan for aircraft 203. This flight plan can be used to identify parameters such as altitude, airspeed, gross weight, and other parameters that are expected to be present at a particular point during current flight 291 of aircraft 203.

Planned state 302 can be used to provide a more accurate estimate of fuel consumption for aircraft 203. In this example, planned state 302 is for a future location of aircraft 203. This future location can be at waypoint 310. Cost index 260 or new speed 261 for planned state 302 can be used when aircraft 203 reaches waypoint 310 from the current location.

For example, a flight plan can have 10 waypoints remaining on the current flight from the current state. Cost index 260 or new speed 261 is determined for each of these planned states to compensate for delay 210.

As aircraft 203 reaches each of these 10 waypoints, cost index 260 or new speed 261 determined for the corresponding waypoint can be used to change the speed of aircraft 203. In this example, the total delay compensation is sum of time saved across all of the waypoints.

Figure 4:
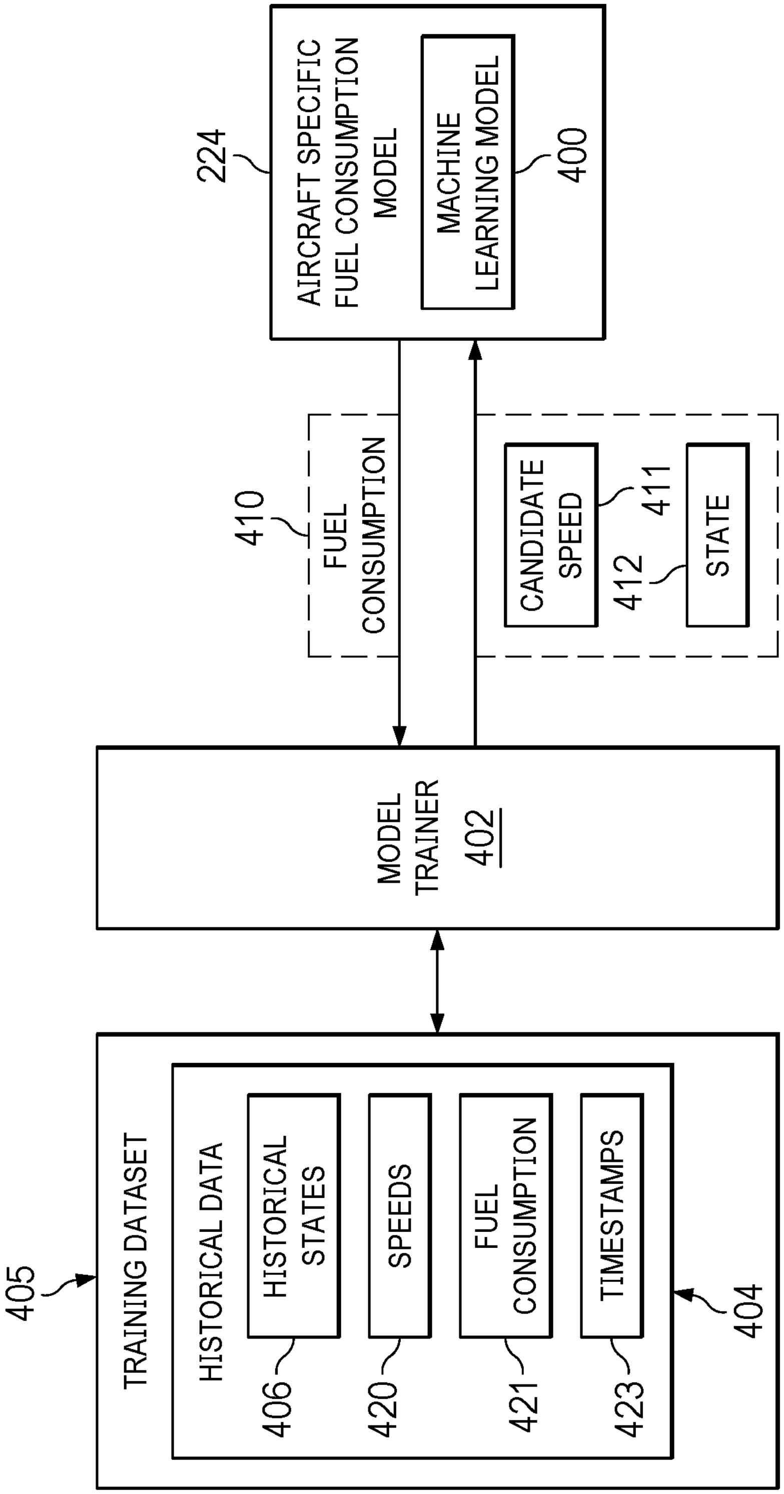
FIG. 4 is an illustration of a dataflow for creating an aircraft specific fuel consumption model in accordance with an illustrative embodiment.

With reference next to FIG. 4, an illustration of a dataflow for creating an aircraft specific fuel consumption model is depicted in accordance with an illustrative embodiment. In this illustrative example, aircraft specific fuel consumption model 224 takes the form of machine learning model 400.

A machine learning model is a type of artificial intelligence model that can be learned without being explicitly programmed. A machine learning model can learn using training data input into the machine learning model. The training data can also be referred to as a training dataset.

The machine learning model can be learned using various types of machine learning algorithms. The machine learning algorithms include at least one of a supervised learning, an unsupervised learning, a feature learning, a sparse dictionary learning, an anomaly detection, a reinforcement learning, a recommendation learning, or other types of learning algorithms. Examples of machine learning models include an artificial neural network, a convolutional neural network, a decision tree, a support vector machine, a regression machine learning model, a classification machine learning model, a random forest learning model, a Bayesian network, a genetic algorithm, and other types of models. These machine learning models can be trained using data and process additional data after training to provide a desired output.

In this illustrative example, model trainer 402 trains machine learning model 400 using training dataset 405. The training is performed such that machine learning model 400 predicts fuel consumption 410 in response to receiving candidate speed 411 and state 412 as an input. Candidate speed 411 is a potential speed of aircraft 203 that may be selected for use in operating aircraft 203 to reduce delay 210. State 412 is the state of aircraft 203.

In this example, model trainer 402 identifies historical data 404 for use in forming training dataset 405. In this illustrative example, historical data 404 is data from prior flights of aircraft 203. Data from other aircraft is not used in this training dataset. In other words, historical data 404 is comprised of data generated by sensor system 219 for aircraft 203 during prior flights of aircraft 203.

In this illustrative example, historical data 404 represents historical states 406 for aircraft 203 that are present for speeds 420 and fuel consumption 421. In this illustrative example, speeds 420 represent different historical speeds of aircraft 203 and can take a number of different forms. For example, speeds 420 can be a Mach number, a ground speed, or some other manner in which speed can be represented for aircraft 203. Fuel consumption 410 can be represented in a number of different ways.

For example, fuel consumption 410 is historical fuel consumption at speeds 420. Fuel consumption 410 can be described as fuel flow rate, fuel consumption rate, fuel burn rate, fuel combustion rate, fuel supply rate, fuel delivery rate, or other types of fuel usage.

Historical states 406 include parameters detected by sensor system 219 for the speeds 420 and fuel consumption 421. These parameters can be comprised of at least one of an altitude of the aircraft, a gross weight of the aircraft, an air temperature of an environment around the aircraft, air angle of attack, horizontal stabilizer position, pressure, total fuel weight, or other parameters that relate to fuel consumption 421. Timestamps 423 are present that enable identifying speeds 420 and fuel consumption 421 that are present for historical states 406 at different times.

In one illustrative example, historical data 404 can be collected for the entire flight or for different phases of flight of aircraft 203. For example, historical data 404 can be collected for a normal straight flight of aircraft 203 or while aircraft 203 is in a cruise phase of current flight 291.

Figure 5:
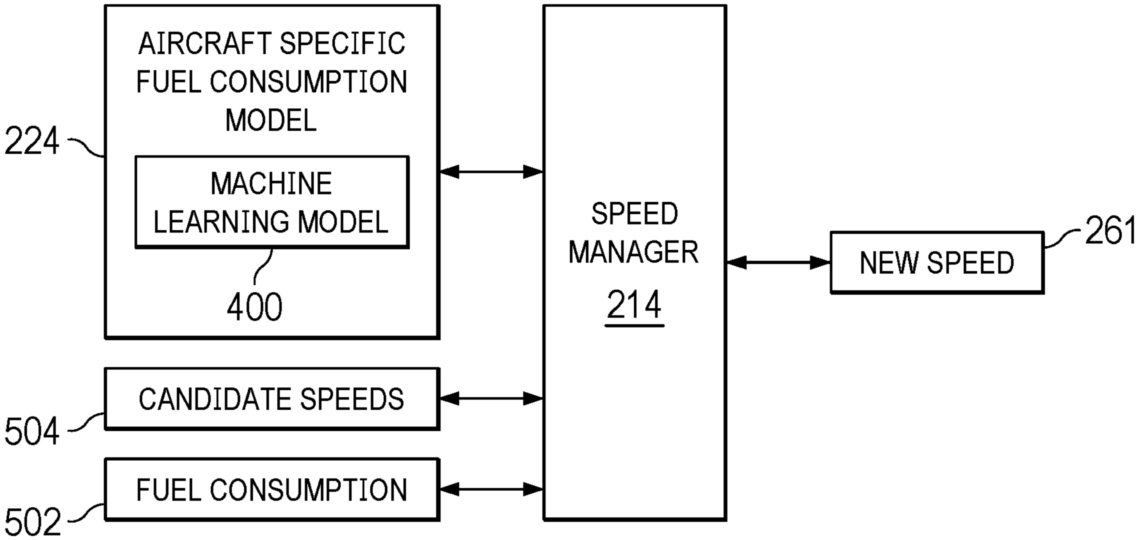
FIG. 5 is an illustration of a dataflow for determining a speed for reducing a delay in accordance with an illustrative embodiment.

With reference next to FIG. 5, an illustration of a dataflow for determining a speed for reducing a delay is depicted in accordance with an illustrative embodiment. In this illustrative example, speed manager 214 identifies candidate speeds 504 for aircraft 203. In this example, these candidate speeds 504 for aircraft 203. In this example, these candidate speeds are ranges of speeds and can be selected based on a number of different factors. For example, aircraft performance, and other factors may be used to determine what speeds are candidate speeds 500.

Speed manager 214 determines fuel consumption 502 for candidate speeds 500 that reduce delay 210 using state 222 of aircraft 203 and aircraft specific fuel consumption model 224 for aircraft 203. In this example, aircraft specific fuel consumption model 224 takes the form of machine learning model 400.

Speed manager 214 identifies fuel consumption 502 for each candidate speeds 504 using machine learning model 400 and state 222 for aircraft 203. Fuel consumption 502 for this candidate speed can be determined from fuel consumption predicted by the machine learning model 400 for the candidate speed.

These determinations result in the identification of fuel consumption 502 for candidate speeds 504. Speed manager 214 selects new speed 261 from candidate speeds 504 that reduces delay 210 with the lowest fuel consumption.

Figure 6:
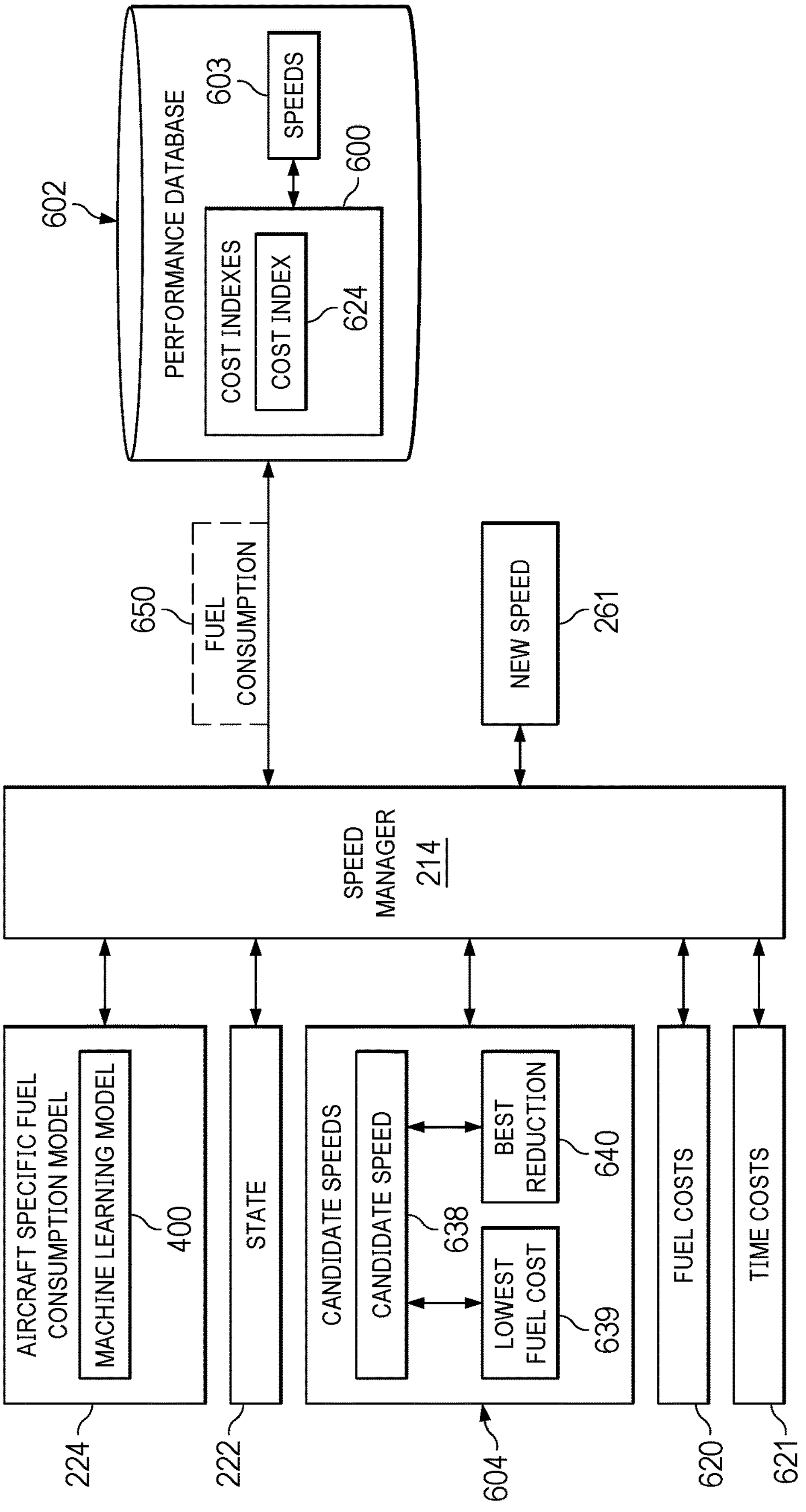
FIG. 6 is an illustration of a dataflow for determining a cost index for reducing a delay in accordance with an illustrative embodiment.

Turning now to FIG. 6, an illustration of a dataflow for determining a cost index for reducing a delay is depicted in accordance with an illustrative embodiment. In this example, current speed 220 for aircraft 203 be changed using cost index 260. Cost indexes are used for setting the speed of commercial airplanes operated by airlines. In this example, speed manager 214 selects cost index 260 that reduces delay 210 for aircraft 203 in a manner that is specific to the performance of aircraft 203 rather than relying on cost index data used for aircraft generally.

In this illustrative example, speed manager 214 selects a range of cost indexes 600 in performance database 602. In this example, performance database 602 provides cost indexes 600 for a range of speeds 603. This range of speeds 603 can be speeds at which aircraft 203 can fly. Each cost index and cost indexes 600 is associated with speed in the range of speeds 603.

This performance database is a generic database that is present in aircraft. This performance database can be generated for a model or a version of an aircraft. However, this database is not accurate with respect to the actual performance of particular instances of the model or modeling version of the aircraft. As a result, performance database 602 does not reflect the actual performance of aircraft 203.

In this illustrative example, a more accurate determination of new speed 261 can be made by speed manager 214. Speed manager 214 determines candidate speeds 604 from the range of cost indexes 600. Speed manager 214 determines fuel costs 620 for candidate speeds 604 that reduce delay 210 using state 222 of aircraft 203 and aircraft specific fuel consumption model 224 for aircraft 203. In this example, aircraft specific fuel consumption model 224 is a machine learning model 400 that predicts fuel consumption 650 from candidate speeds 604 and state 222 of aircraft 203. Speed manager 214 determines fuel costs 620 from candidate speeds 604 using fuel consumption 650 for these candidate speeds.

In this example, cost index 624 corresponding to candidate speed 638 is based on a generic calculation of fuel costs that is not specific to aircraft 203. This cost index is used to control the aircraft to fly at candidate speed 638.

For example, candidate speed 638 that is selected is used to determine cost index 624 that corresponds to candidate speed 638 selected by speed manager 214. That cost index is entered into computer system 212 in aircraft 203, which then changes current speed 220 of aircraft 203 to new speed 261 corresponding to cost index 624.

In this example, speed manager 214 determines reductions in delay 210 for candidate speeds 604. Speed manager 214 determines time costs 621 for candidate speeds using changes in delay 210 for the candidate speeds. As delay 210 is reduced, time costs 621 are reduced.

In this illustrative example, speed manager 214 selects cost index 624 from the range of cost indexes 600 corresponding to candidate speed 638 with lowest fuel cost 639 that provides best reduction 640 in delay 210.

Speed manager 214 can make this selection of candidate speed 638 with lowest fuel cost 639 that provides best reduction 640 in delay 210 using a cost-benefit analysis. In the illustrative examples, an increase in speed for aircraft 203 corresponds to an increase in fuel cost. The increase in speed from one fuel cost to another fuel cost index can be represented by a curve. At some point, the curve becomes flat or substantially flat such that increases in the fuel cost results in increasingly smaller amounts or no increases in speed.

At some point, increasing the speed by a smaller amount does not result in a reduction in delay that is considered to be justifiable with the increase in fuel costs. Diminishing returns are present such that increasing the fuel cost does not provide an increase in speed that reduces delay in an amount that provides a desired level of benefit. As a result, a threshold for increasing the speed of aircraft 203 can be present. This threshold can be a selected speed, a change in speed increase, or some other threshold that can be used to determine when an increase in fuel cost index is not justified by the reduction in delay obtained by the increase in speed.

In this example, cost index 624 can then be used to change current speed 220 to new speed 261. This cost index is entered by the pilot into the flight management computer which then changes current speed 220 of aircraft 203 to new speed 261 that corresponds to cost index 624.

This determination of cost index 624 for aircraft 203 can be performed dynamically during current flight 291 of aircraft 203. For example, speed manager 214 can continue to determine delay 210 and cost index 624 as state 222 of aircraft 203 changes.

Figure 7:
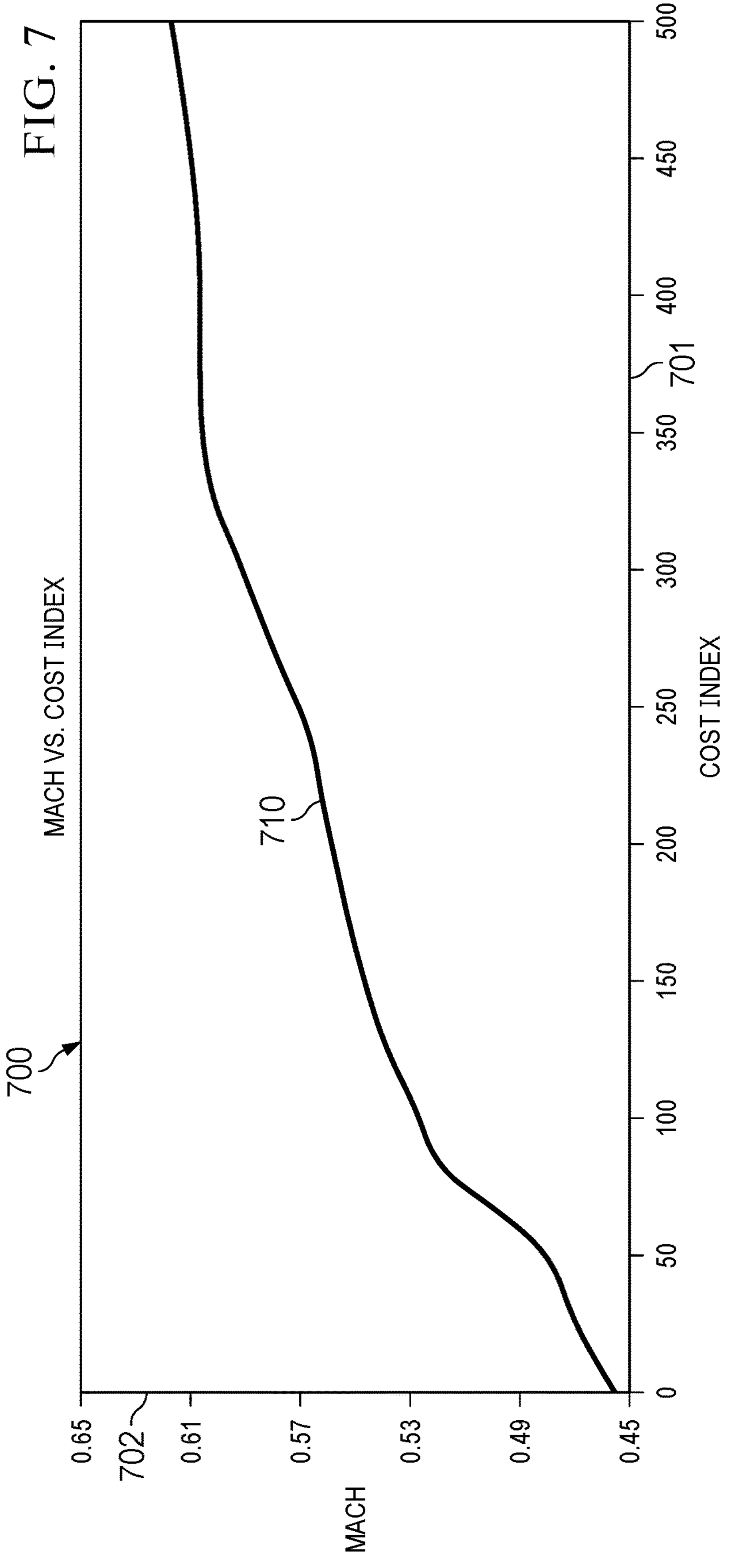
FIG. 7 is an illustration of a Mach versus cost index in accordance with an illustrative embodiment.

With reference next to FIG. 7, an illustration of a graph of Mach versus cost index is depicted in accordance with an illustrative embodiment. As depicted, graph 700 has an x-axis 701 that represents a cost index (CI) and y-axis 702 that represents speed in the form of Mach. Curve 710 represents speed for a cost index. This type of curve can represent information in performance database 602 in FIG. 6.

In this example, the change in speed from a cost index of 250 to a cost index of 400 may be selected. However, the change in the speed from the cost index of 300 to 400 does not result in an appreciable amount of change in the speed of the aircraft for reducing delay as compared to the increase in costs that includes fuel costs. Selecting a change in the cost index from 250 to 325 provides a better benefit with respect to the increase in speed that can be obtained from increasing the cost index.

In this case, selecting 325 as the cost index provides for reducing delay in a manner that reduces undesired fuel consumption. In this example, the selection of this cost index corresponds to a speed with a lowest fuel cost that provides a best reduction in the delay.

Figure 8:
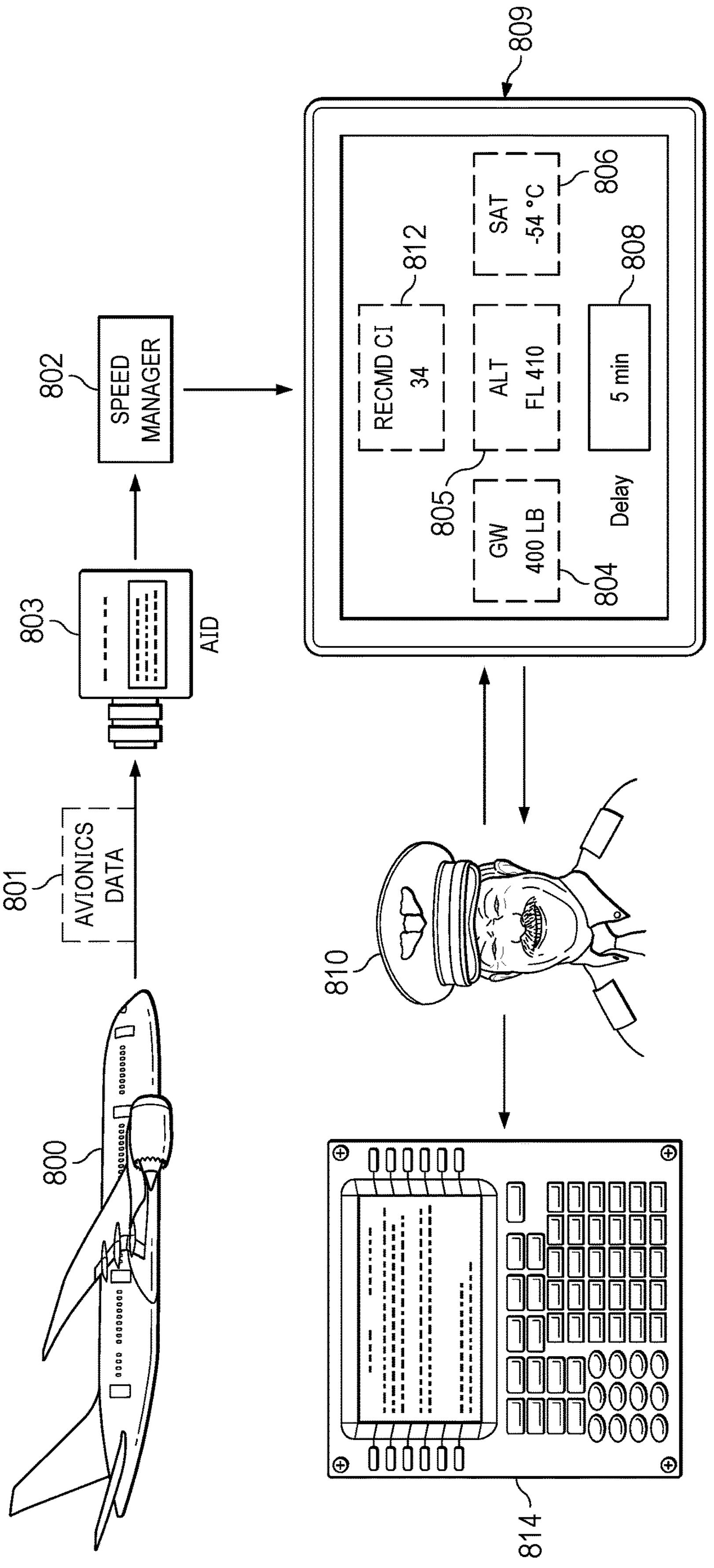
FIG. 8 is an illustration of a dataflow for managing a current flight of a commercial airplane in accordance with an illustrative embodiment.

Turning to FIG. 8, an illustration of a dataflow for managing a current flight of a commercial airplane is depicted in accordance with an illustrative embodiment. In this illustrative example, commercial airplane 800 generates avionics data 801. This avionics data can be received by speed manager 802 via aircraft interspace device (AID) 803. This avionics data can include parameters in the form of gross weight, altitude, and air temperature. Speed manager 802 is an example of an implementation for speed manager 214 in FIG. 2.

In this example, speed manager 802 displays this information in graphical user interface 809. In this example, graphical user interface 809 is an example of an implementation for graphical user interface 235 in FIG. 2. As depicted, gross weight is displayed in GW field 804, altitude is displayed in ALT field 805, and an air temperature is displayed in SAT field 806.

Additionally, graphical user interface 809 includes delay field 808. Pilot 810 can view graphical user interface 809 and enter the delay in delay field 808. In this illustrative example, speed manager 802 identifies a speed for a best reduction in delay that provides a lowest fuel cost. A cost index corresponding to that speed is identified and displayed in RECMD CI field 812.

In this case, pilot 810 can view the recommended cost index and enter that value into flight management computer 814 located in commercial airplane 800. Flight management computer 814 changes the current speed of commercial airplane 800 to the speed corresponding to the recommended cost index entered by pilot 810.

Figure 9:
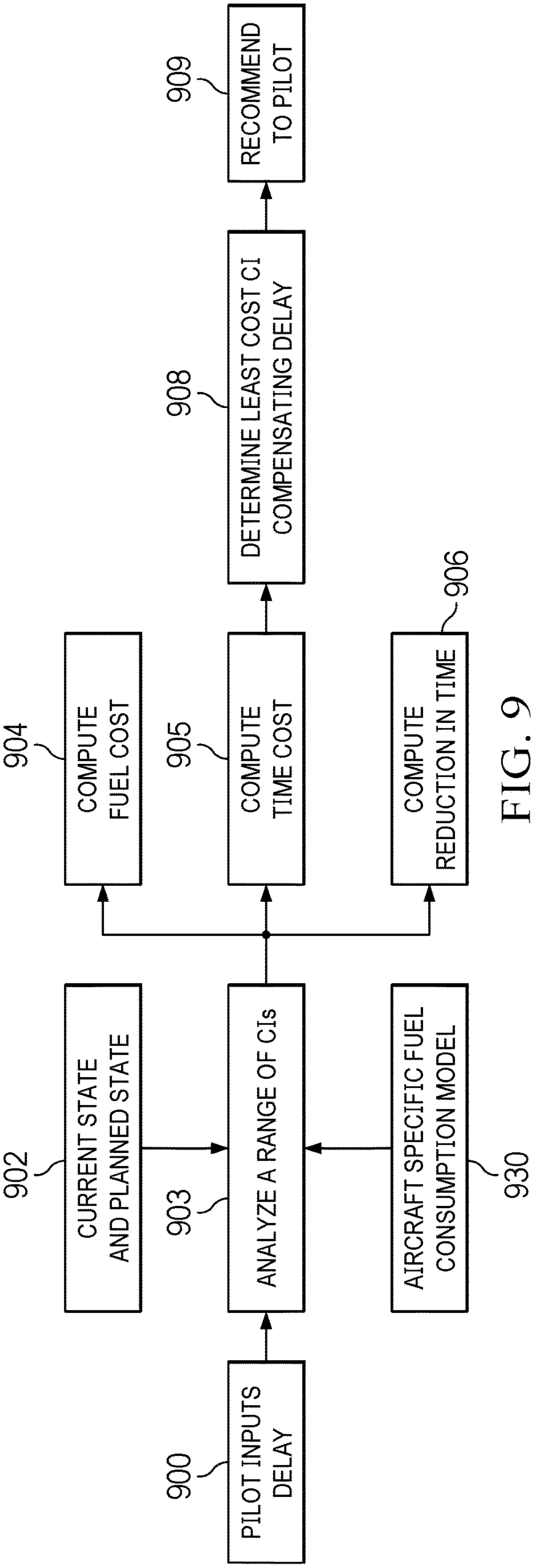
FIG. 9 is an illustration of a dataflow for recommending a cost index in accordance with an illustrative embodiment.

With reference next to FIG. 9, an illustration of a dataflow for recommending a cost index is depicted in accordance with an illustrative embodiment. This dataflow can be implemented in speed manager 214 in FIG. 2 and speed manager 802 in FIG. 8.

In this illustrative example, a pilot inputs the delay in block 900. The current state and planned waypoints of the aircraft are identified in block 902. If the planned waypoints are available, the planned waypoints can be used to predict future changes in fuel cost and time costs at a future point in time for the flight as those waypoints are reached. In other words, these waypoints can be used to initiate the process to identify the cost index.

In this illustrative example, a range of cost indexes are analyzed in block 903. These determinations include computing fuel costs in block 904, time costs in block 905, and a reduction time in block 906. In other words, these computations are performed for each of the cost indexes being analyzed. In this example, potential candidate speeds are determined for each of the cost indexes. In this example, each cost index is based on a speed for the aircraft. These cost indexes are generic and as a result, operating the aircraft at the speed associated with the cost index may result in higher fuel costs than indicated by the model.

In this example, the fuel cost is determined using aircraft specific fuel consumption model 930. This model receives the speeds determined from the cost indexes and a current state of the aircraft. In response, aircraft specific fuel consumption model 930 outputs fuel consumption for the speeds. This fuel consumption can be used to determine the fuel costs for reducing the delay. In these examples, fuel consumption can be the rate of fuel used for fuel burn. This rate can be used to calculate the fuel cost to travel from the current location to the destination location using the speed to reduce the delay.

In this example, the time costs computed in block 905 are based on the change in delay. For example, if the delay is currently 25 minutes and the speed reduces the delay to 5 minutes, then the time costs are reduced by 20 minutes. For example, maintenance, crew costs, and other costs can be based on the amount of time that the aircraft is operated. By reducing the delay by 20 minutes, the time costs are reduced based on that reduction in time during which the aircraft is operated.

The cost index for compensating for the delay with the lowest cost is determined in block 908. This cost index is selected from the range of cost indexes analyzed. In this example, the cost index selected can be the one that provides the best reduction time. The cost index selected can also be based on the cost index that provides the best reduction in delay with the fuel consumption having the lowest fuel cost.

The illustration of this dataflow is an example of one manner in which dataflow can be used in speed manager 214 in FIG. 2 and speed manager 802 in FIG. 8. This example is not meant to limit the manner in which other illustrative examples can be implemented. For example, another illustrative example can take into account another performance metric in addition to fuel consumption. For example, maximum cruise range can be used in addition to or in place of fuel consumption.

Figure 10:
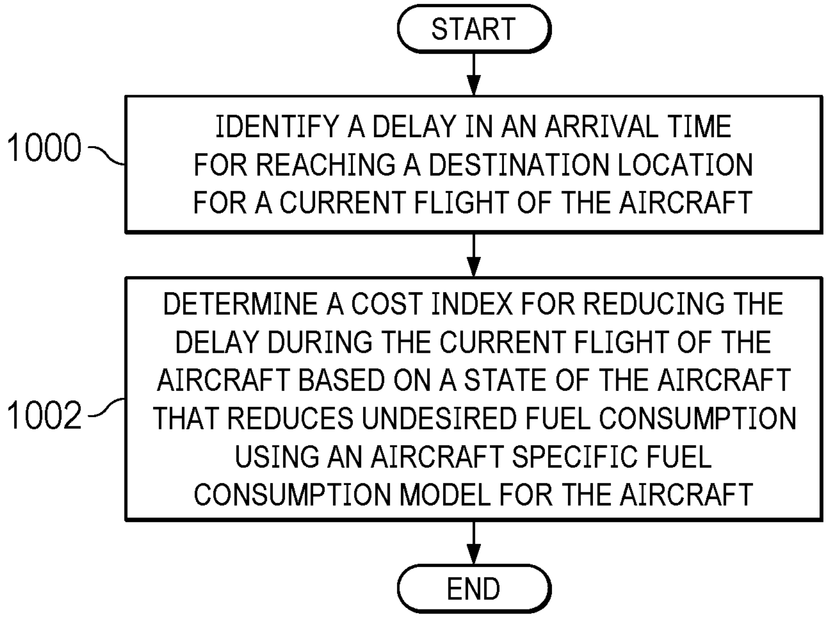
FIG. 10 is an illustration of a flowchart of a process for managing a speed of an aircraft in accordance with an illustrative embodiment.

Turning next to FIG. 10, an illustration of a flowchart of a process for managing a speed of an aircraft is depicted in accordance with an illustrative embodiment. The process in FIG. 10 can be implemented in hardware, software, or both. When implemented in software, the process can take the form of program instructions that are run by one of more processor units located in one or more hardware devices in one or more computer systems. For example, the process can be implemented in speed manager 214 in computer system 212 in FIG. 2 and in speed manager 802 in FIG. 8.

The process identifies a delay in an arrival time for reaching a destination location for a current flight of the aircraft (operation 1000). The process determines a cost index for reducing the delay during the current flight of the aircraft based on a state of the aircraft that reduces undesired fuel consumption using an aircraft specific fuel consumption model for the aircraft (operation 1002). The process terminates thereafter.

Figure 11:
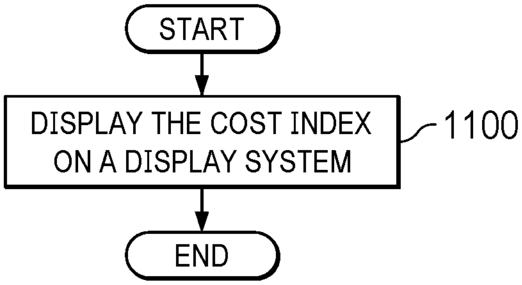
FIG. 11 is an illustration of a flowchart of a process for a cost index in accordance with an illustrative embodiment.

With reference to FIG. 11, an illustration of a flowchart of a process for a cost index is depicted in accordance with an illustrative embodiment. The process in this flowchart is an example of an additional operation that can be performed with the operations in FIG. 10.

The process displays the cost index on a display system (operation 1100). The process terminates thereafter.

Figure 12:
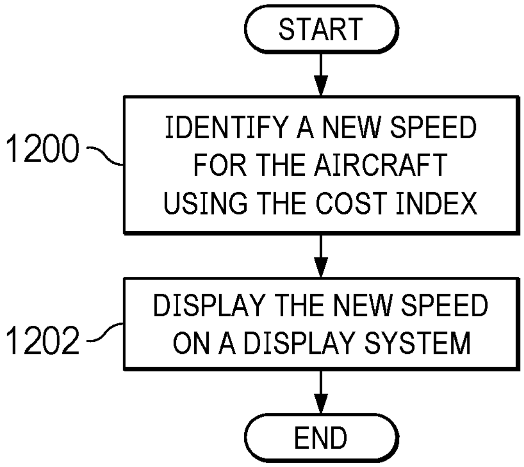
FIG. 12 is an illustration of a flowchart of a process for a new speed in accordance with an illustrative embodiment.

Next in FIG. 12, an illustration of a flowchart of a process for a new speed is depicted in accordance with an illustrative embodiment. The process in this flowchart is an example of additional operations that can be performed with the operations in FIG. 10.

The process identifies a new speed for the aircraft using the cost index (operation 1200). The process displays the new speed on a display system (operation 1202). The process terminates thereafter.

Figure 13:
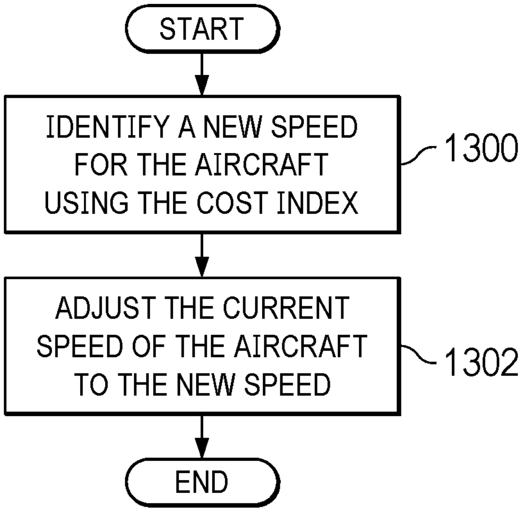
FIG. 13 is an illustration of a flowchart of a process for adjusting a speed of an aircraft in accordance with an illustrative embodiment.

With reference to FIG. 13, an illustration of a flowchart of a process for adjusting a speed of an aircraft is depicted in accordance with an illustrative embodiment. The process in this flowchart is an example of additional operations that can be performed with the operations in FIG. 10.

The process identifies a new speed for the aircraft using the cost index (operation 1300). The process adjusts the current speed of the aircraft to the new speed (operation 1302). The process terminates thereafter.

Figure 14:
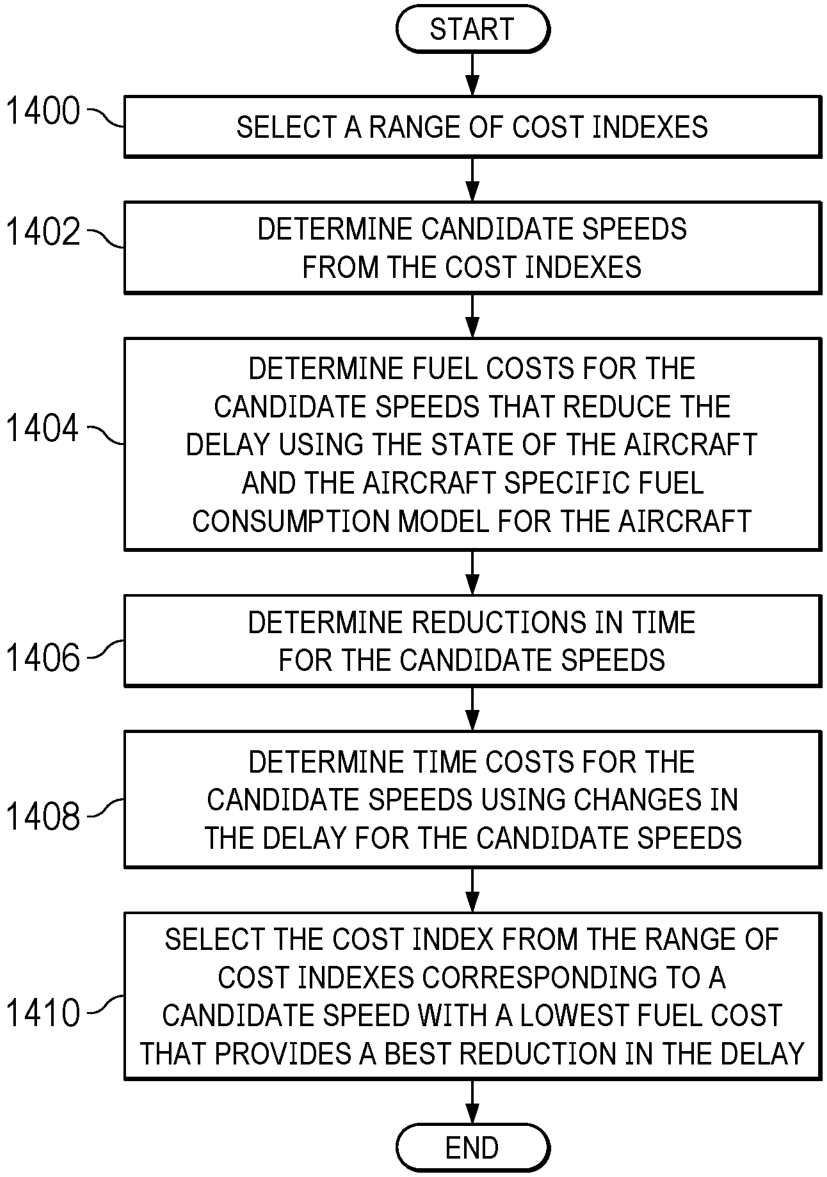
FIG. 14 is an illustration of a flowchart of a process for determining a cost index in accordance with an illustrative embodiment.

With reference next to FIG. 14, an illustration of a flowchart of a process for determining a cost index is depicted in accordance with an illustrative embodiment. The process in this figure is an example of an implementation for operation 1002 in FIG. 10.

The process selects a range of cost indexes (operation 1400). The process determines candidate speeds from the cost indexes (operation 1402).

The process determines fuel costs for the candidate speeds that reduce the delay using the state of the aircraft and the aircraft specific fuel consumption model for the aircraft (operation 1404). The process determines reductions in time for the candidate speeds (operation 1406). The process determines time costs for the candidate speeds using changes in the delay for the candidate speeds (operation 1408).

The process selects the cost index from the range of cost indexes corresponding to a candidate speed with a lowest fuel cost that provides a best reduction in the delay (operation 1410). The process terminates thereafter.

In one illustrative example, the process in FIG. 14 can be performed on a periodic or continuous basis to identify a new cost index for a new speed of the aircraft as the flight of the aircraft progresses. In this manner, dynamic adjustments can be made in response to changing conditions. For example, a tailwind may be encountered that reduces the delay. As a result, a lower cost index may be needed as compared to the determination of the prior time when the tailwind was absent.

Figure 15:
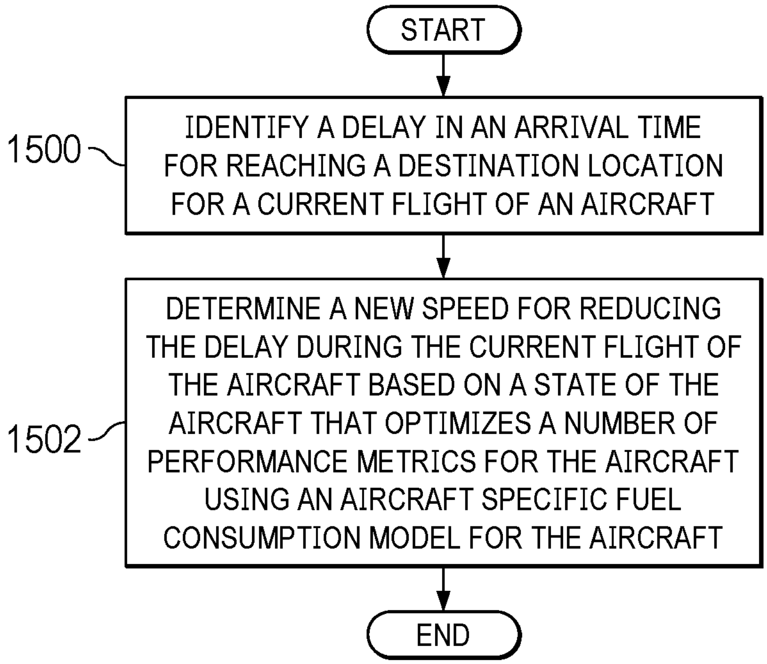
FIG. 15 is an illustration of a flowchart of a process for managing a speed of an aircraft in accordance with an illustrative embodiment.

Turning next to FIG. 15, an illustration of a flowchart of a process for managing a speed of an aircraft is depicted in accordance with an illustrative embodiment. The process in FIG. 15 can be implemented in hardware, software, or both. When implemented in software, the process can take the form of program instructions that are run by one of more processor units located in one or more hardware devices in one or more computer systems. For example, the process can be implemented in speed manager 214 in computer system 212 in FIG. 2 and in speed manager 802 in FIG. 8.

The process identifies a delay in an arrival time for reaching a destination location for a current flight of an aircraft (operation 1500). The process determines a new speed for reducing the delay during the current flight of the aircraft based on a state of the aircraft that optimizes a number of performance metrics for the aircraft using an aircraft specific fuel consumption model for the aircraft (operation 1502). The process terminates thereafter.

In this process, the performance metrics can take a number of different forms. For example, the number of performance metrics can be selected from at least one of a fuel cost, a maximum range cruise, or some other performance metrics.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
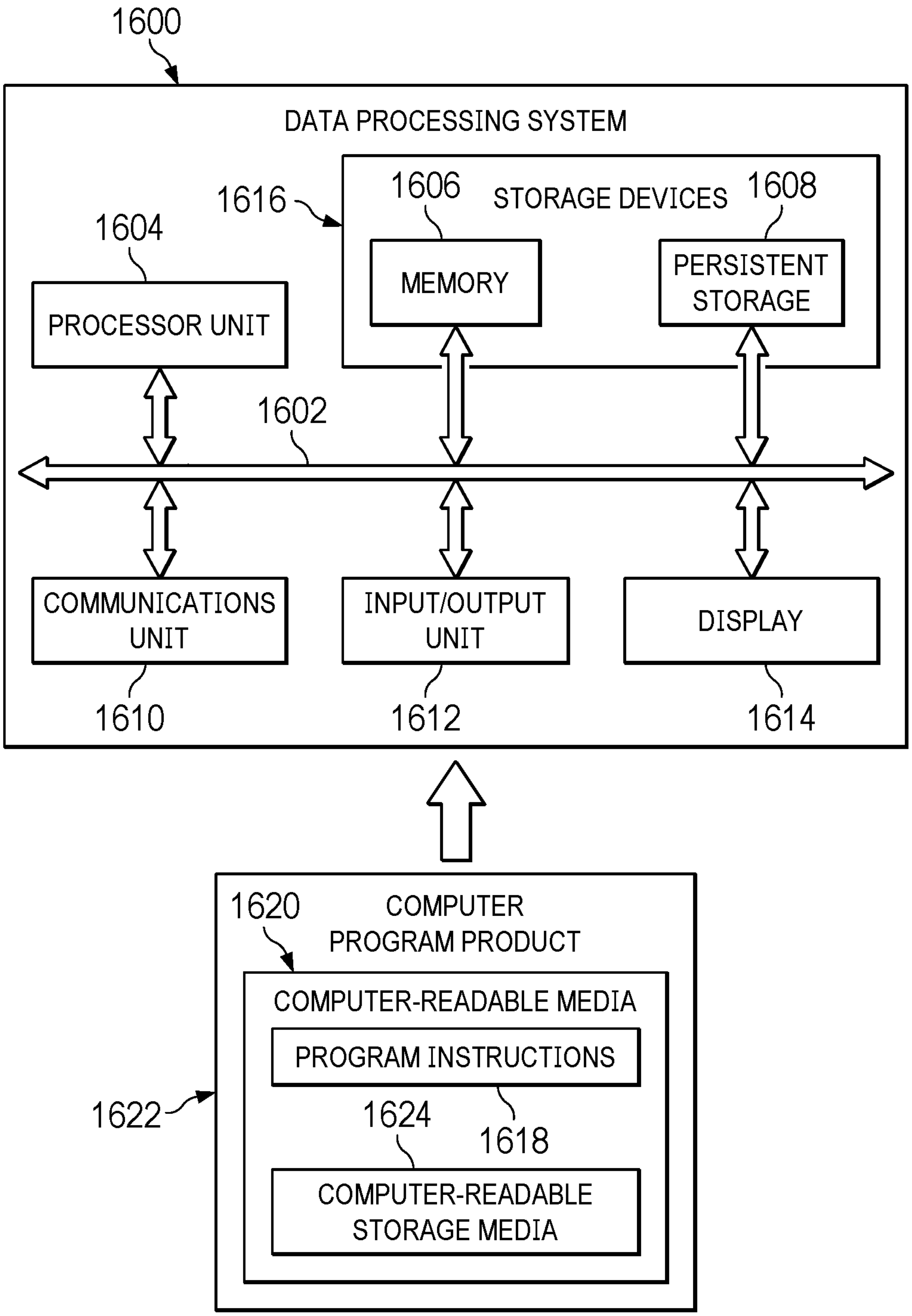
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 can be used to implement flight management system 151 in FIG. 1, computer system 212 in FIG. 2, and flight management computer 814 in FIG. 8.

In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information, either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer-readable program instructions that can be read and executed by a processor in processor unit 1604. The program instructions in the different embodiments can be embodied on different physical or computer-readable storage media, such as memory 1606 or persistent storage 1608.

Program instructions 1618 are located in a functional form on computer-readable media 1620 that is selectively removable and can be loaded onto or transferred to data processing system 1600 for execution by processor unit 1604. Program instructions 1618 and computer-readable media 1620 form computer program product 1622 in these illustrative examples. In the illustrative example, computer-readable media 1620 is computer-readable storage media 1624.

Computer-readable storage media 1624 is a physical or tangible storage device used to store program instructions 1618 rather than a medium that propagates or transmits program instructions 1618. Computer-readable storage media 1624 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 1624, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1618 can be transferred to data processing system 1600 using a computer-readable signal media. The computer-readable signal media are signals and can be, for example, a propagated data signal containing program instructions 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program instructions 1618 can be located in computer-readable media 1620 in the form of a single storage device or system. In another example, program instructions 1618 can be located in computer-readable media 1620 that is distributed in multiple data processing systems. In other words, some instructions in program instructions 1618 can be located in one data processing system while other instructions in program instructions 1618 can be located in one data processing system. For example, a portion of program instructions 1618 can be located in computer-readable media 1620 in a server computer while another portion of program instructions 1618 can be located in computer-readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program instructions 1618.

Figure 17:
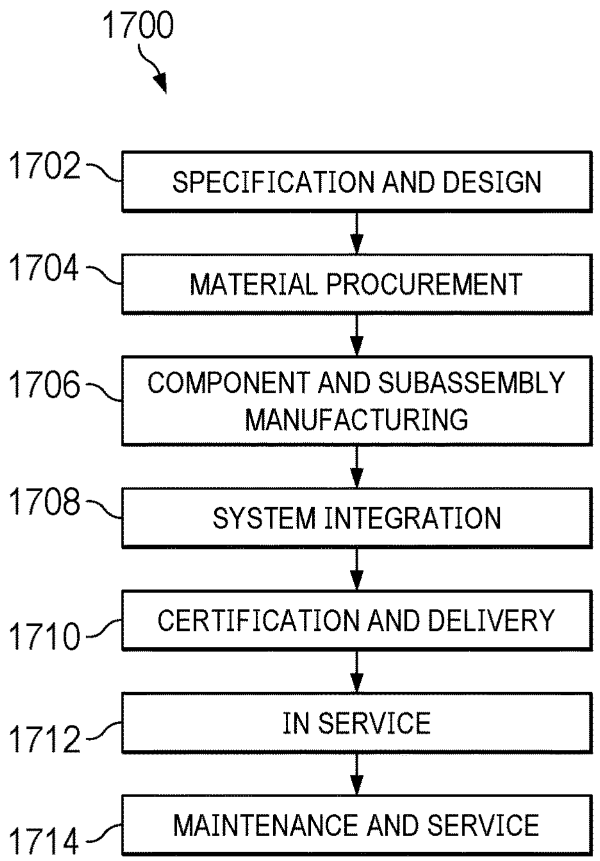
FIG. 17 is an illustration of a block diagram of an aircraft manufacturing and service method in accordance with an illustrative embodiment.
Figure 18:
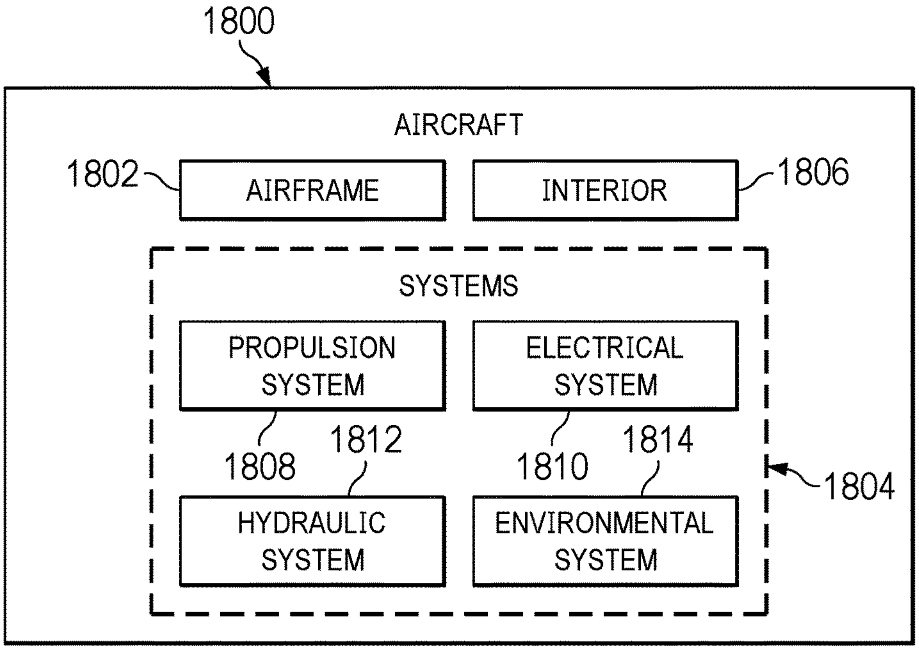
FIG. 18 is an illustration of a block diagram of an aircraft in which an illustrative embodiment may be implemented.

Illustrative embodiments of the disclosure may be described in the context of aircraft manufacturing and service method 1700 as shown in FIG. 17 and aircraft 1800 as shown in FIG. 18. Turning first to FIG. 17, an illustration of a block diagram of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 can go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of a block diagram of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17.

In one illustrative example, components or subassemblies produced in component and subassembly manufacturing 1706 in FIG. 17 can be fabricated or manufactured in a manner similar to components or subassemblies produced while aircraft 1800 is in service 1712 in FIG. 17. As yet another example, one or more apparatus embodiments, method embodiments, or a combination thereof can be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or both. The use of a number of the different illustrative embodiments may substantially expedite the assembly of aircraft 1800, reduce the cost of aircraft 1800, or both expedite the assembly of aircraft 1800 and reduce the cost of aircraft 1800.

For example, a speed manager with an aircraft specific fuel consumption model can be implemented in an aircraft 1800 during at least one of component and subassembly manufacturing 1706 or system integration 1708. Further a speed manager with an aircraft specific fuel consumption model added to aircraft 1800 during maintenance and service 1714 which may include modification, reconfiguration, refurbishment, and other maintenance or service.

In the illustrative examples, the speed manager with the model can be used during service 1712 in a manner that reduces delays and also optimizes fuel consumption. This type of operation can reduce at least one of undesired increases in fuel costs or time costs for aircraft 1800.

Thus, the illustrative examples provide a method, apparatus, system, and computer program product for managing the current speed of an aircraft. In one illustrative example, a computer implemented method for managing a current speed of an aircraft is provided. A number of processor units identify a delay in an arrival time for reaching a destination location for a current flight of the aircraft. The number of processor units determines a new speed for reducing the delay during the current flight of the aircraft based on a state of the aircraft that optimizes a number of performance metrics for the aircraft using an aircraft specific fuel consumption model for the aircraft.

Thus, one or more illustrative examples can provide an ability to reduce delays in arrival times for aircraft in a manner that also produces undesired fuel consumption of an aircraft. In the different illustrative examples, the determinations of speeds or cost indexes for setting speeds of aircraft are based on models that are specific to each individual aircraft. In other words, each individual aircraft can have a fuel consumption model that is specific to that aircraft. A selection of a new speed can reduce the delay in a manner that can be more accurate and increase the fuel efficiency of aircraft as compared to using current models which are generic to aircraft. Further, the different illustrative examples can also take into account other performance metrics such as maximum range cruise.

In the different illustrative examples, this model can be added as an additional component in addition to the current cost index models placed in aircraft. This model can be used to select the appropriate cost index to control the fight of aircraft such as a commercial airplane in which cost indexes are entered to control the speed of the aircraft when reducing delay.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft speed management system that comprises:
- a computer system; and
- a speed manager located in the computer system, wherein the speed manager in the computer system is configured to continuously execute the following in a flight powered by an engine that consumes a fuel:
  - identify a delay in an arrival time for reaching a destination location for a current flight of an aircraft;
  - determine a new speed that reduces the delay during the current flight of the aircraft based on parameters that affect a fuel consumption of the aircraft, wherein the new speed optimizes a number of performance metrics for the aircraft based upon an aircraft specific fuel consumption value continuously generated, by a machine learning model in an aircraft specific fuel consumption model for the aircraft configured to update an aircraft specific fuel consumption value based upon: the state of the aircraft, an engine operating history, a maintenance history of engines on the aircraft, and parts replaced on the aircraft; and
  - determine fuel cost for candidate speeds that reduce the delay using the state of the aircraft and the aircraft specific fuel consumption model for the aircraft powered by an engine that consumes a fuel;
  - subsequently select, from among the candidate speeds that reduce the delay, candidate speeds that have a lowest fuel cost; and
  - subsequently select the new speed that provides a best reduction in the delay from among the candidate speeds that have a lowest fuel cost and reduce the delay;
- control the aircraft to fly at the new speed.

2. The aircraft speed management system of claim 1, wherein the number of performance metrics selected from at least one of a fuel consumption or a maximum range cruise.

3. The aircraft speed management system of claim 1, wherein the speed manager is configured to identify the delay and determine the new speed at each change in the state of the aircraft.

4. The aircraft speed management system of claim 1, wherein the parameters that affect the fuel consumption of the aircraft comprise a position of a horizontal stabilizer on the aircraft.

5. The aircraft speed management system of claim 1, wherein the parameters that affect the fuel consumption of the aircraft comprise: an altitude of the aircraft, a gross weight of the aircraft, and an air temperature of an environment around the aircraft.

6. The aircraft speed management system of claim 1, wherein the parameters that affect the fuel consumption of the aircraft comprise all of: air angle of attack, horizontal stabilizer position, and total fuel weight.

7. The aircraft speed management system of claim 1, wherein the computer system is selected from at least one of a flight management computer, a flight management system, or an electronic flight bag.

8. The aircraft speed management system of claim 1, wherein:
- the computer is located remote from the aircraft; and
- the aircraft is selected from a group that comprises: a commercial airplane, a cargo airplane, a rotorcraft, a tilt-rotor aircraft, a tilt wing aircraft, a vertical takeoff and landing aircraft, an electrical vertical takeoff and landing vehicle, a personal air vehicle, and an unmanned aerial vehicle.

9. A computer implemented method for managing a current speed of an aircraft powered by an engine that consumes fuel, wherein the computer implemented method comprises continuously:

identifying, by a number of processor units, a delay in an arrival time for reaching a destination location for a current flight of the aircraft;

determining, by the number of processor units, a new speed for reducing the delay during the current flight of the aircraft by using a machine learning model in an aircraft specific fuel consumption model for the aircraft continuously updating an aircraft specific fuel consumption value using: parameters that affect a fuel consumption of the aircraft, an engine operating history, a maintenance history of engines on the aircraft, and parts replaced on the aircraft that optimizes a number of performance metrics for the aircraft; and determining, by the number of processing units, fuel cost for candidate speeds that reduce the delay using the state of the aircraft and the aircraft specific fuel consumption model for the aircraft powered by an engine that consumes a fuel;

subsequently selecting, by the number of processing units, from among the candidate speeds that reduce the delay, candidate speeds that have a lowest fuel cost; and subsequently selecting, by the number of processing units, the new speed that provides a best reduction in the delay from among the candidate speeds that have a lowest fuel cost and reduce the delay;

controlling the aircraft to fly at the new speed.

10. The aircraft speed management system of claim 1, wherein the speed manager is located on the aircraft.

11. The aircraft speed management system of claim 1, wherein the delay is resultant from at least one of: a delayed departure from the gate, unexpected maintenance, a delayed takeoff time, or a change in the route for the flight of caused by environmental conditions or traffic.

12. The method of claim 9, wherein the number of performance metrics optimized are selected from at least one of a fuel consumption or a maximum range cruise.

13. The method of claim 9, wherein the number of processor comprise a speed manager identifying the delay and determine the new speed at each change in the state of the aircraft.

14. The method of claim 9, wherein the parameters that affect the fuel consumption of the aircraft comprise a position of a horizontal stabilizer on the aircraft.

15. The method of claim 9, wherein he parameters that affect the fuel consumption of the aircraft comprise an altitude of the aircraft, a gross weight of the aircraft, and an air temperature of an environment around the aircraft.

16. The method of claim 9, wherein the parameters that affect the fuel consumption of the aircraft comprise an angle of attack of the aircraft.

17. The method of claim 9, wherein e parameters that affect the fuel consumption of the aircraft comprise both horizontal stabilizer position and total fuel weight on the aircraft.

18. The method of claim 9, wherein the computer system is selected from at least one of a flight management computer, a flight management system, or an electronic flight bag.

19. The method of claim 9, wherein the aircraft is selected from a group that comprises: a commercial airplane, a cargo airplane, a rotorcraft, a tilt-rotor aircraft, a tilt wing aircraft, a vertical takeoff and landing aircraft, an electrical vertical takeoff and landing vehicle, a personal air vehicle, and an unmanned aerial vehicle.

20. The method of claim 9, wherein the computer is located remote from the aircraft.

* * * * *